United States Patent [19]
Heilig et al.

[11] Patent Number: 5,823,619
[45] Date of Patent: Oct. 20, 1998

[54] VEHICLE SEAT

[75] Inventors: Alexander Heilig, Wissgoldingen; Helmut Maiwald, Schechingen, both of Germany

[73] Assignee: TRW Occupant Restraint Systems GmbH, Alfdorf, Germany

[21] Appl. No.: 806,734

[22] Filed: Feb. 27, 1997

[30]     Foreign Application Priority Data

Mar. 4, 1996 [DE] Germany .......................... 296 03 991.8
Jun. 3, 1996 [DE] Germany .......................... 296 09 786.1

[51] Int. Cl.⁶ ...................................................... B60N 2/42
[52] U.S. Cl. .................. 297/216.12; 297/216.13; 297/61
[58] Field of Search ................................ 297/61, 216.12, 297/216.13, 408

[56]             References Cited

U.S. PATENT DOCUMENTS

| | | | |
|---|---|---|---|
| 3,397,911 | 8/1968 | Brosius, Sr. ........................ | 297/216.12 |
| 3,713,694 | 1/1973 | Miller ............................... | 297/216.13 X |
| 5,378,043 | 1/1995 | Viano et al. ..................... | 297/216.12 X |
| 5,484,189 | 1/1996 | Patterson ......................... | 297/216.12 X |
| 5,669,661 | 9/1997 | Pajon ................................. | 297/216.13 |

*Primary Examiner*—Peter R. Brown
*Attorney, Agent, or Firm*—Tarolli, Sundheim, Covell, Tummino & Szabo

[57]            ABSTRACT

A vehicle seat comprises a back rest with a headrest. A flexible traction element extends through the interior of the back rest and is adapted to respond to the movement of an inertial mass shifted in a rear end impact and to cause a displacement of an attachment means of the traction element on the headrest. The displacement is converted in a mechanical setting mechanism, coupled with the traction element, into a movement of the headrest toward the head of the occupant to reduce the distance between the headrest and the head of the occupant.

18 Claims, 4 Drawing Sheets

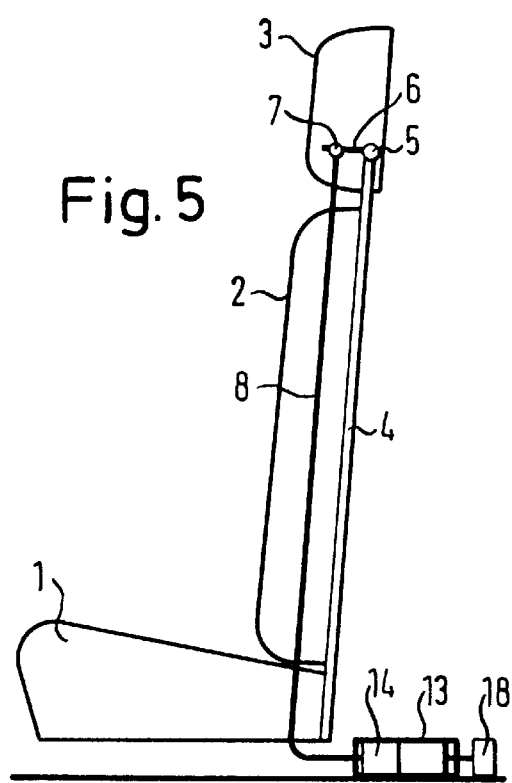
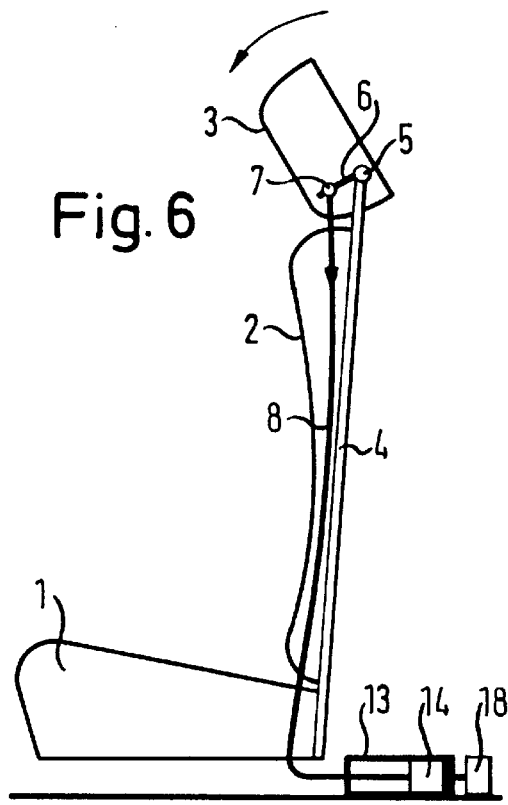
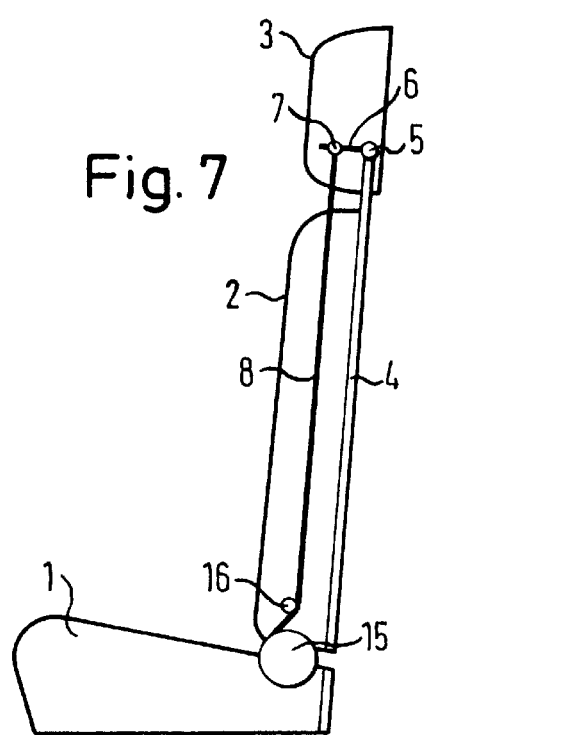
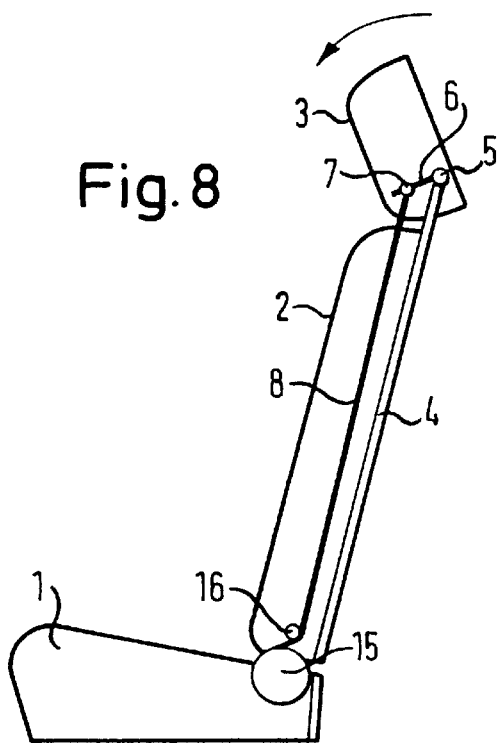

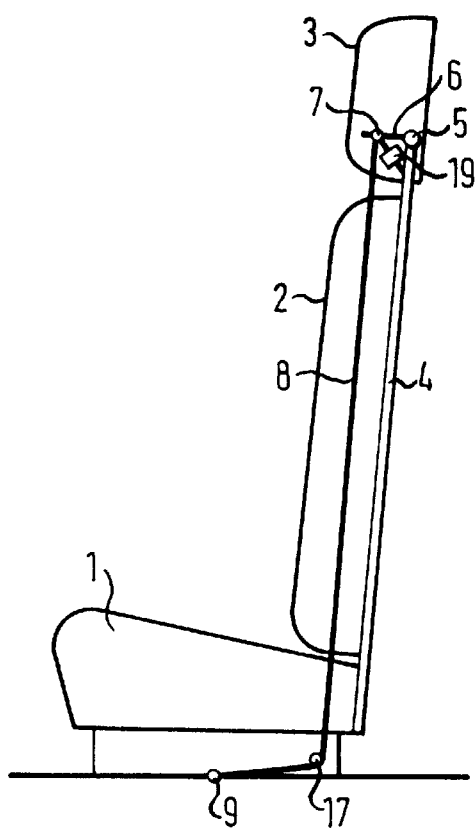
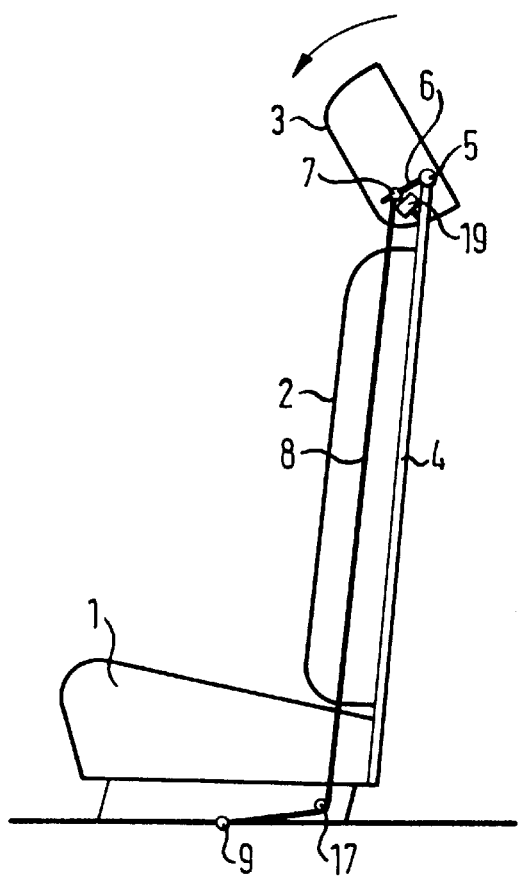

VEHICLE SEAT

The invention relates to a vehicle seat comprising a back rest with a headrest.

BACKGROUND OF THE INVENTION

The headrest of a vehicle seat has the purpose of supporting the head of a vehicle occupant in a backward direction in the case of a rear end impact. Since, however, there is normally a relatively large distance between the headrest and the head of the occupant, the head of the occupant is firstly thrown backward in relation to the vehicle seat in a rear end impact until it engages the headrest. The leads to a shearing movement in the cervical vertebral region which frequently causes a whiplash injury.

SUMMARY OF THE INVENTION

The invention provides a simple vehicle seat substantially preventing the user's head from being thrown backward in a rear end impact. The vehicle seat according to the invention comprises a back rest, a headrest secured to the back rest, a flexible traction element, a mechanical setting mechanism coupling the traction element and the headrest with each other and an inertial mass. The traction element extends through the interior of the back rest and has an attachment point at which the traction element is secured to the mechanical setting mechanism. The inertial mass is movable under inertial forces in a direction opposite to normal vehicle travel and engages said traction element. The traction element is adapted to transmit movement of the inertial mass to the attachment point in a rear end impact. The mechanical setting mechanism is adapted to convert the movement of the attachment point into a movement of the headrest toward the head of an occupant sitting in the vehicle seat. The vehicle seat of the invention with its integrated setting mechanism for the headrest together with the flexible traction element is characterized by a simple and reliable structure.

The flexible traction element is preferably a tape or a fabric inlay, which is normally tensed between two attachment points within the seat.

In the case of one embodiment, the headrest is pivotally mounted to the back rest. The traction element is mounted to the headrest or to a lever coupled therewith so that the traction element pivots the headrest toward the head of the seat user in the case of a impact. The support's pivot bearing is integrated in the headrest, if desired. The setting mechanism so created, able to be operated via the flexible traction element, is extremely sturdy.

As an alternative to this design, the setting mechanism may comprise a guide for the headrest enabling the headrest to slide along the guide, said guide being for instance provided as a linear guide incorporated in the back rest. The headrest is held and directed obliquely upward toward the head of the seat occupant. This means that there is an adjusting movement of the headrest directed obliquely upward toward the head of the occupant.

The shiftable inertial mass may comprise the back rest itself, the movement taken up by the traction element in a rear end impact being a rearward pivotal movement of the back rest in relation to the vehicle. The back rest must in this case be so pivotally secured to the seat cushion that during normal driving, apart from normal pivoting caused by adjustment of the back rest by the seat user, there is no possibility of accidental pivoting, such pivoting only occurring when there are strong forces, resulting from a rear end impact, acting on the back rest.

In a further embodiment, an inertial mass is provided able to be moved in relation to the vehicle along a linear guiding means for movement in translation, such inertial mass being coupled with the traction element. In a vehicle impact, the inertial mass will be displaced along its guiding means in relation to the vehicle to the rear. This setting movement is diverted by the traction element toward its point of attachment to the headrest, where it leads to a movement and displacement of the attachment means.

A further possibility for causing displacement of the attachment point of the headrest is one in which a backward movement of the vehicle seat in a rear end impact in relation to the vehicle is permitted, such movement being responded to by the traction element.

Furthermore, there may be a provision such that the traction element is trained through the interior of the back rest and may be bowed and additionally tensioned when the seat occupant is pressed into the back rest in a rear end impact so that it causes the displacement of the headrest attachment point of the traction element. In this design the inertial mass is the body of the occupant. The relative movement of the occupant toward the back rest of the vehicle in a rear end impact is responded to by the taut traction element, which is bowed and tensioned by the occupant.

BRIEF DESCRIPTION OF THE DRAWINGS

FIG. 5 and FIG. 6 show corresponding elevations of a third embodiment of the vehicle seat of the invention which includes an inertial mass adapted to be shifted in translation in a closed guide.

FIG. 7 and FIG. 8 show corresponding views of a fourth embodiment of the vehicle seat of the invention having a back rest able to be pivoted in a rear end impact.

FIG. 9 and FIG. 10 show corresponding elevations of a fifth embodiment of the vehicle seat of the invention, in the case of which the vehicle seat is displaced backward in relation to the vehicle in translation in a rear end impact.

DETAILED DESCRIPTION OF THE INVENTION

Figure 1:
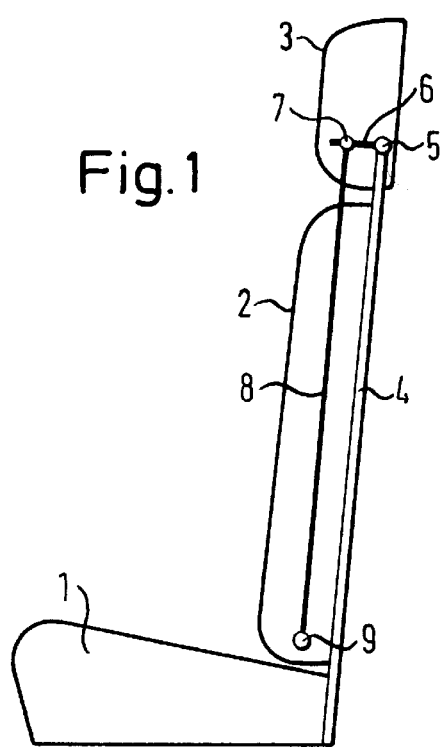
FIG. 1 shows a partially sectioned, diagrammatic lateral elevation of the vehicle seat of the invention in the normal neutral condition.

FIG. 1 illustrates a first embodiment of a vehicle seat having a seat cushion 1 (meaning the generally horizontal and usually upholstered part of the seat), a back rest 2 and a headrest 3 secured thereto as such seat during normal travel of the vehicle is loaded by an occupant, not shown. A frame 4 which is integrated in the back rest 2 and extends upward from the same has a top end with a pivotal bearing 5, by means of which the headrest 3 is connected with the frame 4. A lever 6 which is also mounted on the pivotal bearing 5 and which is coupled with the headrest 3 has an attachment point 7 for a flexible traction element 8 in the form of a broad fabric tape. The traction element 8 extends from its attachment point 7 on the headrest drawn taut in a straight line from a front upholstered rear rest part through the interior of the back rest 2 as far as the bottom end of the back rest 2, where it is secured at its end 9 adjacent to the floor of the vehicle. As an alternative the traction element 8 may also be attached on the seat cushion 1 as shown in FIGS. 3 and 4.

Figure 2:
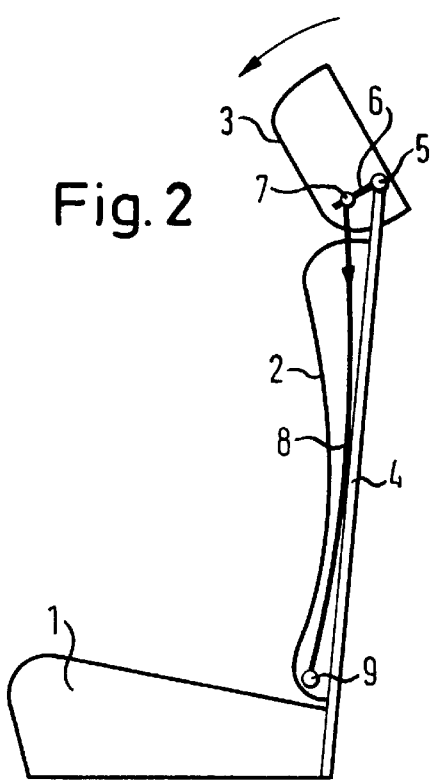
FIG. 2 shows the vehicle seat of FIG. 1 in a rear end impact.

In a rear end impact the upper torso of the vehicle occupant acts as an inertial mass and owing to such inertia is thrust so far into the back rest 2 that the traction element 8 is bowed toward the rear of the vehicle and its attachment point 7 on the headrest is pivoted downward with the result that a pivotal movement of the headrest 3 in the direction of the arrow is caused toward the head of the occupant about the axis of the pivot bearing 5, as shown in FIG. 2. The attachment point 7 together with the lever 6 and the pivot bearing 5 accordingly constitute a simple mechanical setting mechanism for the headrest 3 which converts the movement, responded to by the traction element 8, of the upper torso in the form of a displacement of the attachment point 7 into a movement of the headrest 3. The distance of the occupant's head from the headrest 3 is accordingly positively or actively reduced until the same strikes the headrest 3 so that the maximum shear movement, occurring between the occupant's head and upper torso, and the acceleration rate of the head are reduced.

Figure 3:
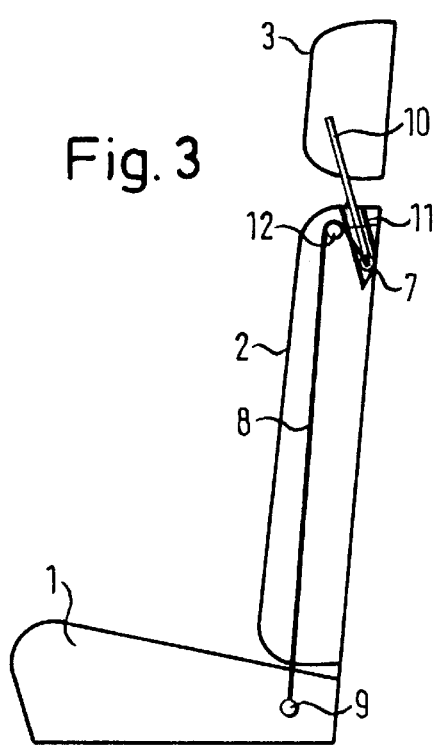
FIG. 3 and FIG. 4 show corresponding elevations of a second embodiment of the vehicle seat of the invention.
Figure 4:
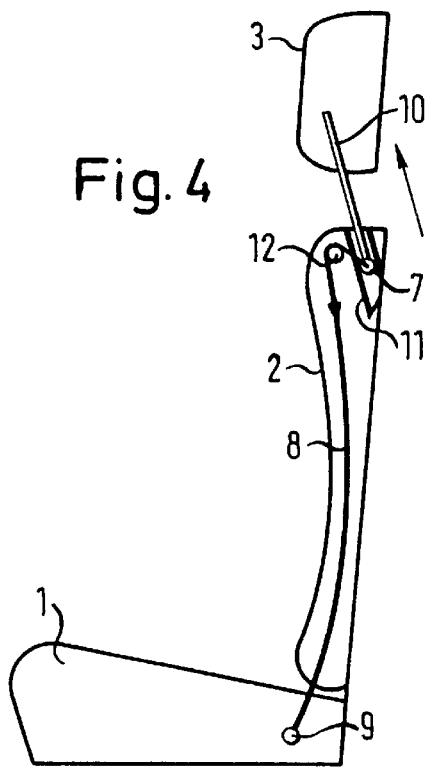

In accordance with the second embodiment illustrated in FIGS. 3 and 4 the headrest 3 is connected with the back rest 2 by two rod-like parts 10 which are held or arrested on it. The rod-like parts 10 in this case run in guides 11 in the form of linear guides in the back rest 2 and are shiftingly received therein. The guides 11 are directed obliquely upward toward the head of the said occupant. The bottom end of each rod-like part 10 possesses an attachment point 7 for two top ends of a sheet-like fabric inlay constituting the traction element 8. The fabric inlay extends out from the attachment points 7 in the interior of the back rest 2 obliquely upward to a deflection means 12 and thence through the interior of the back rest 2 to the seat cushion 1, on which it is secured. In this embodiment, the guides 11, the rod-like parts 10 and the deflection means 12 define a mechanical setting mechanism which converts movement of the attachment point 7 into movement of the headrest 3. The sheet-like fabric inlay is in this case sufficiently drawn taut between the two attachment points 7 on the headrest and the attachment on the seat cushion 1 that in a rear end impact the movements will occur which are shown in FIG. 4.

The upper torso of the occupant is thrust more deeply into the back rest 2 with the result that the traction element 8 is bowed or bent backward and the attachment points 7 are drawn obliquely upward. Accordingly by way of the two rod-like parts 10 the headrest 3 is pushed obliquely upward in the guide 11 toward the head of the vehicle occupant so that the distance of the headrest 3 from the occupant's head, which is now moving which are certain time lag behind the upper torso, is reduced.

In the third embodiment as shown in FIGS. 5 and 6 an inertial mass 14 is received in a cylinder 13 defining a guiding means for translatory sliding movement therein, said cylinder 13 being attached to the vehicle floor. The traction element 8, which is caused to extend through the in the interior of back rest 2, is secured to the inertial mass 14. The drawing does not show deflection pulleys provided for guiding the traction element 8 and mounted on the seat frame 4. The structure of this vehicle seat adjacent to back rest 2 and of the headrest 3 is the same as that of the vehicle seat depicted in FIGS. 1 and 2.

In a rear end impact the inertial mass 14 will be displaced in the cylinder 13 backward in relation to the vehicle so that the traction element 8 attached thereto will pivot the lever 6 together with headrest 3 counter-clockwise. Owing to the inertial mass of the occupant, who in a rear end impact will be thrust into the back rest 2, the traction element 8 will be bowed as in the vehicle seat of FIGS. 1 and 2. This will aid in pivoting of the headrest 3 forward.

The fourth embodiment illustrated in figures 7 and 8 differs from the embodiments so far shown to the extent that the back rest 2 will be pivoted to the rear in a rear end impact in relation to the vehicle. A back rest setting mechanism 15 comprises a rotary bearing and a coupling, not illustrated. The coupling is so designed that under the action of powerful forces as occur in a rear end impact owing to the inertial mass of the upper torso of the vehicle occupant and of the back rest 2, it permits a pivoting movement of the back rest 2 to the rear in relation to the vehicle. In the present embodiment of the invention the flexible traction element 8 extends from its attachment point 7 and, in the taut state thereof, through the interior of the back rest 2 along an entrainment means 16, secured to the back rest 2, as far as the setting mechanism 15 from the back rest, where it is held on the part integral with the vehicle.

In a rear end impact the coupling integrated in the back rest setting mechanism 15 is released owing to the sum of the inertial forces of the upper torso of the vehicle occupant and of the back rest 2 together with the headrest 3, and the back rest 2 pivots in relation to the vehicle to the rear. During this pivotal motion the entrainment means 16 shifts the traction element 8 because during the pivotal movement it is further wound up on a cylindrical body in the setting mechanism 15 for the back rest. Owing to this displacement the attachment point 7 is moved further downward and the headrest 3 is pivoted counter-clockwise. In the case of this embodiment as well it is possible to so design the back rest 2 that the upper torso of the occupant bows the traction element 8 and aids in the pivoting of the headrest 3.

In the case of the fifth embodiment illustrated in FIGS. 9 and 10 the traction element 8 extends through the interior of the back rest 2 and of the seat cushion 1 as far as the floor of the vehicle to which it is secured at its end adjacent to the floor. An entrainment means 17 which is attached to the seat frame serves a bend means for the traction element 8. The vehicle seat is so mounted in a linear guide in the vehicle that it may automatically move in translation to the rear in a rear end impact owing to the inertial forces, which are caused by the seat and the vehicle occupant, in relation to the vehicle. This may for example be ensured if a conventional mechanism for the setting of the vehicle seat in the longitudinal direction of the vehicle is provided with a coupling or with a shear pin serving to permit the displacement of the vehicle seat only at very high forces.

In a rear end impact the vehicle seat will move to the rear in relation to the vehicle so that the entrainment means 17 will slide along the traction element 8 and will align it approximately parallel to the vehicle floor along a fair length with the result that the attachment point 7 is drawn downward and the headrest 3 is pivoted counter-clockwise and forward.

Figure 11:
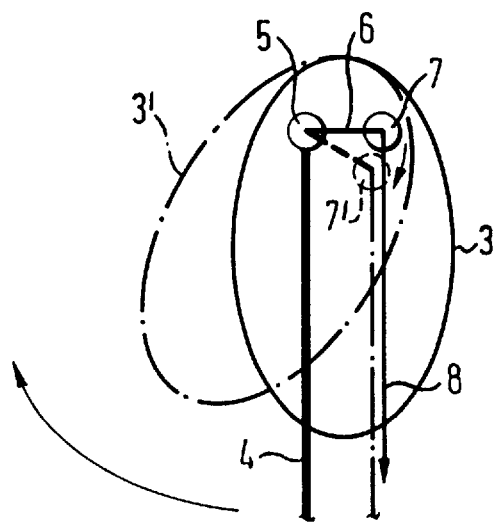
FIG. 11 diagrammatically shows one way of pivotally mounting the headrest as an alternative to the design of FIG. 1.
Figure 12:
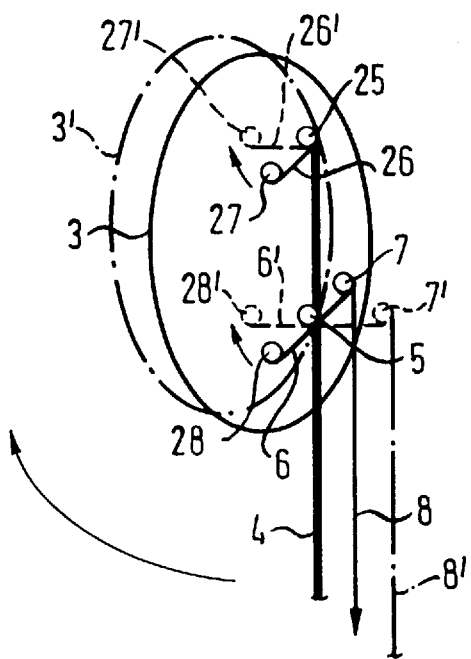
FIG. 12 shows a further manner of pivotally mounting the headrest.

Further possibilities for mounting the headrest 3 in an adjustable manner are depicted in FIGS. 11 and 12. In the case of the manner of mounting the headrest 3 as shown in FIGS. 11 the pivot bearings is arranged adjacent to the top end of the headrest 3 and, considered in the longitudinal direction of the vehicle, in front of the attachment point 7.

In the initial position the lever 6 extends horizontally in an aligned manner from the pivot bearing 5 to the attachment point 7. When the traction element 8 is shifted downward, the headrest 3 is pivoted about the pivot bearing 5 so that the bottom end of the headrest 3 is moved a considerable distance forward and assumes final position marked in chained lines. The reference numerals employed for the parts located in the end position all bear an apostrophe.

The headrest 3 as shown in FIG. 12 is connected via an upper single-armed lever and a bottom two-armed lever 6 with the frame 4. By the ratio of the length of both arms of the lever 6, the movement of the inertial body can be converted into an increased movement of the headrest 3. The levers 26 and 6 possess corresponding pivot bearings 25 and, respectively, 5 and are pivotally attached at support points 27 and, respectively, 28 to the headrest 3. The free end of the rear lever arm seen in the longitudinal direction of the vehicle, of lever 6 possesses the attachment point 7 for the traction element 8.

On operation of the traction element 8 the headrest 3 pivots into the position referenced 3', that is to say in the longitudinal direction of the vehicle as indicated by arrows, forward and upward, since the lever 6 is pivoted in the clockwise direction. The lever 26, which serves to provide a firm mount for the headrest 3, passively takes part in the pivoting movement. The reference numerals employed for the parts located in the end position all bear an apostrophe.

The occupant's head is supported in good time by the automatically moved headrest 3 and held in position with the result that loads on the cervical vertebrae and on the head are substantially reduced to a level below that in a vehicle seat without a self-setting set headrest.

Adjacent to the pivot bearing 5 and adjacent to the guides 11 there is, furthermore, a holding device, not illustrated, which holds the headrest 3 in the set position. The purpose of this is to ensure that the head of the vehicle occupant impinges on a positionally set headrest 3 in a rear end impact. The holding device may comprise a clamping mechanism and/or a detent mechanism. For instance it is possible for a lever, which is able to be pivoted, together with a toothed disk to constitute such a holding device, said toothed disk being rotatably mounted on the pivot bearing means 5 and secured to the headrest 3. The inertial lever can fit into recesses in the tooth disk during setting of the headrest 3 and lock the headrest 3 in its foremost position. Another possibility for the design of a holding mechanism is such that on pivoting of the headrest 3 the setting mechanism is thrust against a wedge, or vice versa, the setting mechanism is jammed.

The traction element may also be coupled with a linkage, which is for instance integrated in the headrest 3. The linkage serves to vary the ratio of the setting path of the headrest 3 to the path along which the attachment point 7 is displaced.

For damping the movement of the headrest it is possible to provide a damping element, as for example the damping element 18 extending into the cylinder 13 as shown in FIGS. 5 and 6 the damping element 19 located between the lever 6 and the frame 4 as shown in FIGS. 9 and 10. Using a linkage and the damping elements it is possible for the setting path and timing to be varied.

We claim:

1. A vehicle seat comprising a back rest, a headrest secured to said back rest, a flexible traction element in the form of an inlay within said vehicle seat, and a mechanical setting mechanism coupling said traction element and said headrest with each other, said traction element extending through the interior of said back rest and having at one end a first attachment point at which said traction element is secured to said mechanical setting mechanism and at an opposite end a second attachment point at which it is secured to one of a vehicle and said vehicle seat, a collision force acting on said traction element in case of a rear end impact in a direction opposite to normal vehicle travel displacing said traction element and its first attachment point, said displacement of said first attachment point leading to a movement of said headrest toward the head of an occupant sitting in the vehicle seat.

2. The vehicle seat as claimed in claim 1, wherein said flexible traction element is an elongated flexible tape.

3. The vehicle seat as claimed in claim 1, wherein said inlay is a fabric inlay.

4. The vehicle seat as claimed in claim 1, wherein said headrest is pivotally mounted to said back rest by a pivotal bearing and is pivoted toward the head of an occupant in a rear end impact.

5. The vehicle seat as claimed in claim 4, wherein said pivotal bearing is integrated in said headrest.

6. The vehicle seat as claimed in claim 4, wherein said mechanical setting mechanism comprises part of said headrest.

7. The vehicle seat as claimed in claim 4, wherein said mechanical setting mechanism comprises a lever coupled to said headrest is provided to which said traction element is attached.

8. The vehicle seat as claimed in claim 4, wherein said back rest is pivoted in relation to said vehicle in the case of a rear end impact, said traction element being coupled to said back rest to take up the pivotal movement of said back rest during a rear end impact.

9. The vehicle seat as claimed in claim 10, wherein said seat has a seat cushion and a frame at least partly extending in said seat cushion, said traction element having a lower end attached to said frame, and said back rest comprising an entrainment means adapted to engage and to shift said traction element during pivoting.

10. The vehicle seat as claimed in claim 1, wherein said setting mechanism includes a guide for said headrest to enable said headrest to be shifted along said guide.

11. The vehicle seat as claimed in claim 8, wherein said guide is a linear guide provided within said back rest, said linear guide being directed obliquely upwards and towards the head of said occupant.

12. The vehicle seat as claimed in claim 1, wherein linear guiding means are adapted to be mounted to the vehicle and are provided for guiding an inertial mass which is movable along said guiding means in relation to said vehicle seat, said traction element being coupled with said inertial mass.

13. The vehicle seat as claimed in claim 1, wherein said vehicle seat is horizontally movable in relation to said vehicle in case of an rear end crash in response to inertial forces, said horizontally movement of said vehicle seat being taken up by said traction element.

14. The vehicle seat as claimed in claim 13, wherein said traction element has a lower end adopted to be attached to said vehicle, and wherein said back rest comprises an entrainment means adapted to engage and to shift said traction element during translatory movement of said vehicle seat.

15. The vehicle seat as claimed in claim 1, wherein said traction element is bowed and tensioned in response to said collision force acting thereon.

16. The vehicle seat as claimed in claim 1, wherein said setting mechanism includes means for converting displacement of said traction element into an increased movement of said headrest.

17. The vehicle seat as claimed claim 1, wherein a damping element adapted to damp said movement of said headrest is provided.

18. A vehicle seat comprising a back rest, a headrest secured to said back rest, a flexible traction element in the form of a fabric inlay within said vehicle seat and a mechanical setting mechanism coupling said traction element and said headrest with each other, said traction element extending through the interior of said back rest and having at one end a first attachment point at which said traction element is secured to said mechanical setting mechanism and at an opposite end a second attachment point at which it is secured to one of said vehicle and said vehicle seat, a collision force acting on the traction element in case of a rear impact in a direction opposite to normal vehicle travel displacing said traction element and its first attachment point, said displacement of said first attachment point leading to a movement of said headrest toward the head of an occupant sitting in the vehicle seat.

* * * * *

UNITED STATES PATENT AND TRADEMARK OFFICE
CERTIFICATE OF CORRECTION

PATENT NO. : 5,823,619
DATED : October 20, 1998
INVENTOR(S) : Alexander Heilig et al.

It is certified that error appears in the above-identified patent and that said Letters Patent is hereby corrected as shown below:

Col. 6, line 33
  replace "10"
  with --8--.

Col. 6, line 42
  replace "8"
  with --10--.

Col. 6, line 56
  replace "adopted"
  with --adapted--.

Signed and Sealed this

Thirteenth Day of July, 1999

Attest:

Q. TODD DICKINSON

Attesting Officer    Acting Commissioner of Patents and Trademarks